April 14, 1942.   A. N. MILSTER ET AL   2,279,409
BRAKE TESTING APPARATUS
Filed Feb. 23, 1939   2 Sheets-Sheet 2
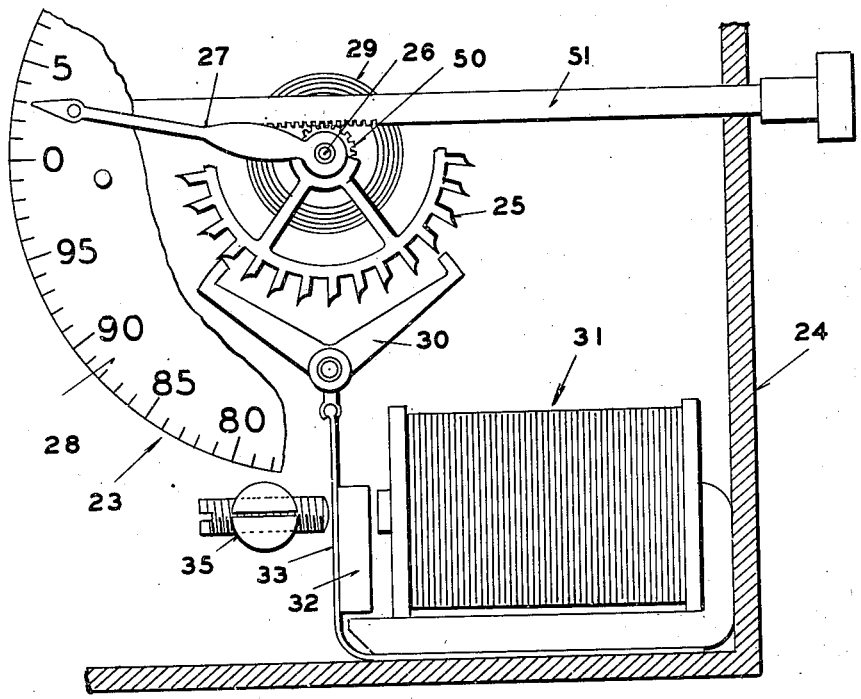
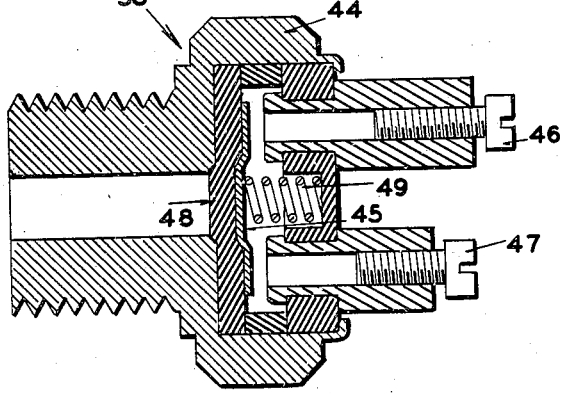
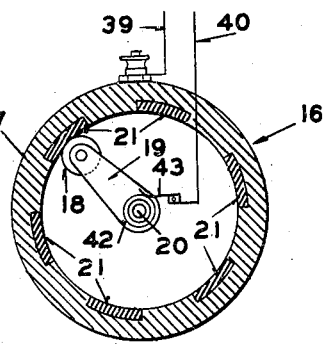
INVENTORS
A.N. MILSTER
JOHN C. COX
BY
ATTORNEY Patented Apr. 14, 1942

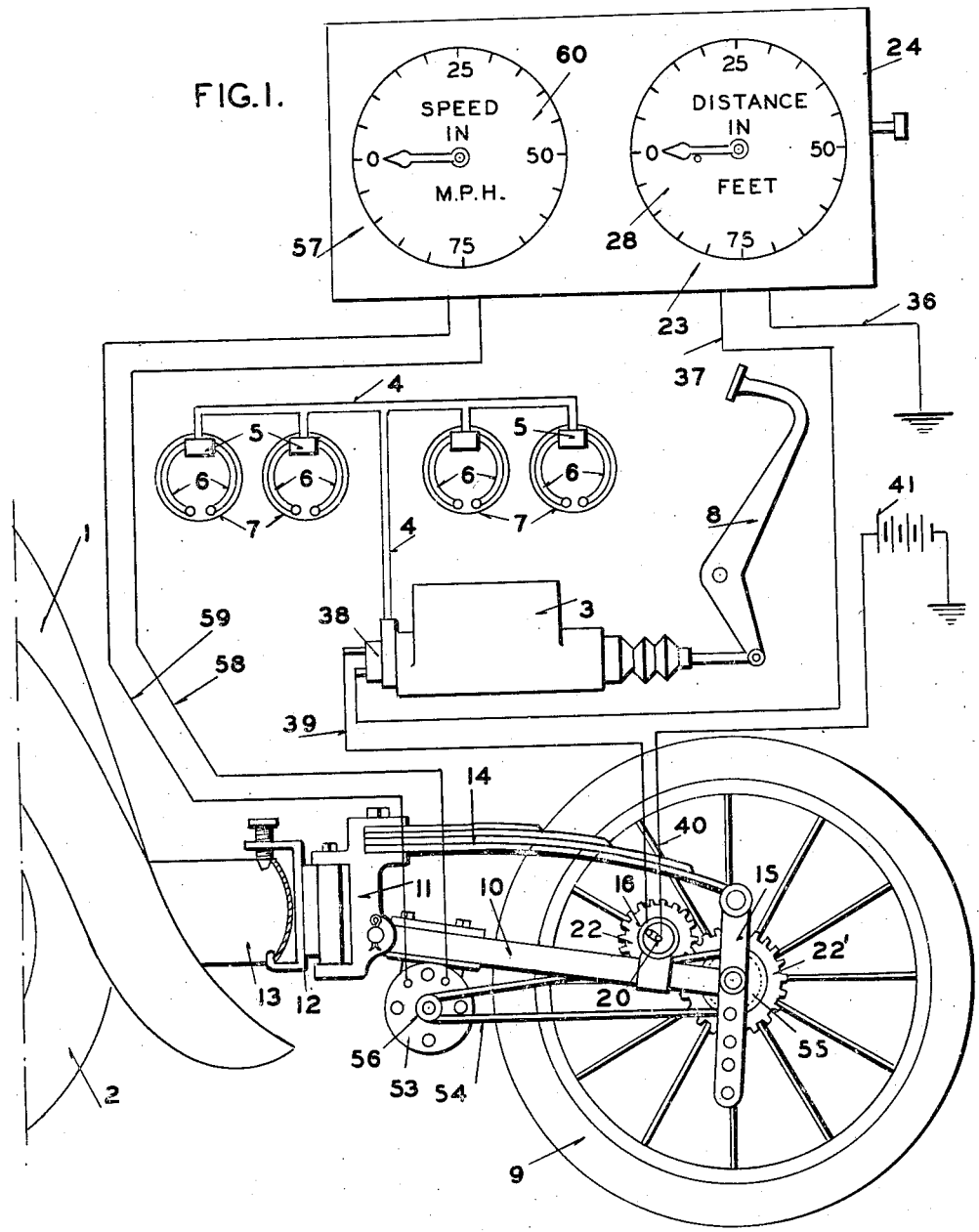

2,279,409

UNITED STATES PATENT OFFICE 2,279,409

BRAKE TESTING APPARATUS

Arthur N. Milster, Ferguson, and John C. Cox, St. Louis, Mo., assignors to Wagner Electric Corporation, St. Louis, Mo., a corporation of Delaware Application February 23, 1939, Serial No. 257,948

2 Claims. (Cl. 73—51)

Our invention relates to testing apparatus and more particularly to apparatus for testing the brakes on a vehicle when being used under actual operating conditions.

One of the objects of our invention is to provide improved means for determining the distance a vehicle travels after the brakes have been applied to stop the vehicle.

Another object of our invention is to provide improved testing apparatus of the fifth wheel type for the brakes of a vehicle in which recording instruments therefor are so associated with and operated by the fifth wheel that they can be positioned at any desired place in the vehicle for convenient reading.

Still another object of our invention is to provide a brake testing apparatus in which the instruments thereof can be operated by electrical apparatus under the control of a separate road wheel adapted to be attached to a vehicle.

Other objects of our invention will become apparent from the following description taken in connection with the accompanying drawings in connection with Figure 1 is a view, partly diagrammatic, showing a testing apparatus embodying our invention; Figure 2 is an enlarged view of the distance meter, parts being broken away; Figure 3 is a cross-sectional view of the timer; and Figure 4 is a cross-sectional view of the control switch associated with the braking system.

Referring to the drawings in detail, numeral 1 indicates the rear portion of an automobile having wheels 2 (one only being shown) with which is associated a well-known hydraulic braking system schematically illustrated. Briefly this system comprises a master cylinder or compressor 3 connected by conduits 4 to motors 5 for actuating the brake shoes 6 of the brakes 7 associated with the vehicle wheels. The master cylinder is controlled by the brake pedal 8 mounted for actuation by the operator.

The testing apparatus is operated by a fifth wheel 9 journaled to an arm 10 pivotally connected to a bracket 11 which in turn is pivotally mounted on an attaching member 12 for detachably connecting the wheel to the rear bumper 13 of the vehicle. A leaf spring 14 is also secured at one end to the bracket and at the other end to the arm 10 by an adjustable link 15. The spring maintains the wheel 9 on the roadway and the connection of the wheel to the attaching member is such that the wheel may swing laterally and also vertically with respect to the bumper, thus insuring that the wheel will properly trail the vehicle.

The arm 10 adjacent the journal of the fifth wheel has mounted thereon a timer 16 comprising a fixed metal ring 17 and a cooperating contact roller 18 carried on an arm 19 fixed to a shaft 20. Imbedded in the inner surface of the metal ring are a plurality of similar insulating strips 21 circumferentially spaced apart a distance equal to their length to provide for the breaking and making of the electrical contact between the ring and roller. The shaft 20 of the timer is driven by a gear 22 which meshes with a gear 22' fixed to the hub of the fifth wheel. The gears are so related to each other and the fifth wheel that for each foot of linear travel of the wheel, the roller of the timer will move a distance corresponding to the length of an insulating strip or the equal length of the space between the insulating strips.

The meter 23 for recording the number of linear feet traveled by the fifth wheel is enclosed in a casing 24. As shown in Figure 2, this meter comprises a toothed escapement wheel 25 secured to shaft 26 which carries a pointer 27 for cooperation with a dial 28 having thereon suitable marks and figures to indicate the distance traveled in feet. The escapement wheel, shaft and pointer are acted upon by a light coil spring 29, one end of which is secured to the shaft and the other to the casing of the meter. The wheel is controlled by a pivotally mounted V-shaped escapement lever 30, the ends of which cooperate with the teeth of the wheel in a well-known manner. Adjacent the escapement lever is an electrical magnet 31 having a cooperating armature 32 mounted upon a leaf spring 33, one end of which is attached to the magnet and the other end to the short arm on the escapement lever. An adjustable stop 35 limits the movement of the leaf spring away from the magnet. One end of the coil of the magnet is connected to ground by an electrical conductor 36 and the other end of the coil is connected by a conductor 37 to one terminal of a switch 38. The other terminal of the switch is connected by a conductor 39 to the metal ring 17 of the timer. In order to complete the circuit, the arm 19 of the timer is connected by a conductor 40 to a grounded battery 41, the connection at arm 19 being made by a slip-ring 42 and a brush 43.

The switch 38 may be operated as desired but it is shown as one which can be actuated by a predetermined pressure in the brake lines, such pressure being necessary to place the brake shoes of the brakes in operative engagement with the wheel drums. The switch shown in Figure 4 may be the stop light switch or a similar independent switch and comprises a casing 44 screwed into the end of the master cylinder. The contact piece 45 for electrically connecting the terminals 46 and 47 is actuated by fluid pressure through a flexible diaphragm 48, said contact piece normally being held away from the terminals by a spring 49.

In order that the pointer 27 may be reset to zero after a measurement of distance has been taken, there is provided a gear 50 on shaft 26 and cooperating therewith is a toothed plunger 51 which extends to the exterior of the instrument casing 24 where it can be engaged by the operator's hand and shoved inwardly to bring the pointer back to zero.

When making a brake test to ascertain the stopping distance, it is also desirable to have an accurate reading of the speed of the vehicle at the time the brakes are applied instead of depending upon the reading of the vehicle speedometer which often may be unreliable. This is accomplished by also employing the fifth wheel 9. On arm 10 is secured an electric generator 53 which is driven by a belt 54 passing over a pulley 55 secured to the hub of the fifth wheel and a pulley 56 on the end of the generator shaft. The generator is such that the current generated is proportional to the speed of the fifth wheel. Therefore, to measure the speed it is only necessary to use an ammeter 57 which is conveniently placed in the instrument casing 24 and electrically connected to the generator by conductors 58 and 59. The ammeter is provided with a dial 60 which has suitable marks and numbers thereon to indicate the speed in miles per hour.

The conductors 36, 37, 58 and 59 are of sufficient length that the casing containing the instruments may be placed in any desired place preferably the operator's compartment of the vehicle. The box may be very conveniently held in the lap of the person making the test.

To make the test the fifth wheel is attached to the rear of the vehicle and the switch 38 connected in the brake line. As previously noted this switch may already be in the brake system in the form of a stop light switch and, therefore, it is only necessary to connect the conductors 37 and 39 to the terminals thereof. The distance meter is set at zero. When the desired speed is reached (shown on the ammeter dial 60) at which a test is desired to be made, the brakes are applied to stop the vehicle. As soon as pressure is developed in the braking system to apply the brakes, the switch 38 is closed. This will now place the timer in circuit with the magnet and as the roller 18 of the timer passes over the inner surface of the timer ring, the circuit will be alternately closed and opened. Each time the circuit is closed, the armature 32 will make one-half an oscillation thereby causing the escapement lever to permit the escapement wheel to move the pointer one division on the dial which indicates that the wheel has traveled one foot. When the circuit is broken, the armature completes its oscillation and returns to its position against the leaf spring stop 35. This now causes the escapement lever to permit the pointer to be moved another division on the dial to indicate that another foot has been transversed by the fifth wheel. The making and breaking of the circuit continues until the vehicle stops or the brakes are released. The distance traveled in making the stop may now be read on the distance indicating dial, thus giving an accurate record of the condition of the brakes, that is, whether they are capable of stopping the vehicle at a given speed in a given distance as required by law.

By means of the brake testing apparatus just described, it is possible to make a very accurate test of the condition of the vehicle brakes. The apparatus is portable and easily attached to the vehicle as all that is necessary is to connect the bracket 11 to the bumper and the conductors to the stop light switch. If a fluid-operated switch is not present or the brakes are not fluid-actuated, the switch 38 may be of another form and otherwise so mounted that the switch will be closed when the brakes are applied.

Being aware of the possibility of modifications in the particular structure herein described without departing from the fundamental principles of our invention, we do not intend that its scope be limited except as set forth by the appended claims.

Having fully described our invention, what we claim as new and desire to secure by Letters Patent of the United States is:

1. A portable brake testing apparatus for association with a vehicle provided with a fluid-actuated brake system to thus permit the obtaining of the linear distance the vehicle travels after the brakes have been applied, said apparatus comprising a road engaging wheel other than a wheel of the vehicle and provided with means for ready attachment to and detachment from the vehicle, a distance indicating instrument including a movable member, a ratchet mechanism for moving said movable member, means including an electrically-operated magnet for operating the ratchet mechanism, an electrical circuit for said magnet, a timer mounted adjacent the road engaging wheel and including a movable contacting element for making and breaking said circuit, means for moving said contacting element by the road engaging wheel so as to intermittently energize said magnet, a switch for said circuit, and means for closing said switch by fluid pressure in the brake system when said fluid pressure is sufficient to apply the brakes, said distance indicating instrument, the ratchet mechanism and the magnet being housed as a unit, and said electrical circuit including electrical conductors of such length as to permit the housed unit to be moved as desired and positioned at a remote distance from the road engaging wheel.

2. A portable brake testing apparatus for association with a vehicle provided with a fluid-actuated brake system to thus permit the obtaining of the linear distance the vehicle travels after the brakes have been applied, said apparatus comprising a road engaging wheel other than a wheel of the vehicle, a frame for said wheel, means for readily attaching and detaching the frame to the vehicle, a distance indicating instrument including a movable member, a ratchet mechanism for moving said movable member, means including an electrically-operated magnet for operating the ratchet mechanism, an electrical circuit for said magnet, a timer mounted on the frame adjacent the wheel and including a plurality of circumferentially spaced fixed contacts and a cooperating rotatable contacting element for making and breaking said circuit, a connection for rotating said contacting element by the road engaging wheel so as to intermittently energize said magnet, a switch for said circuit, means for closing said switch by fluid pressure in the brake system when said fluid pressure is sufficient to apply the brakes, said distance indicating instrument, the ratchet mechanism and the magnet being housed as a unit, and said electrical circuit including electrical conductors of such length as to permit the housed unit to be moved as desired and positioned at a remote distance from the road engaging wheel, and manually-controlled means on said housed unit for resetting the distance indicator after a distance has been indicated.

ARTHUR N. MILSTER.
JOHN C. COX.